United States Patent [19]
Masujima et al.

[11] 3,892,520
[45] July 1, 1975

[54] ANNEALING OVEN FOR THERMOLUMINESCENCE DOSIMETER

[75] Inventors: Kiyohiko Masujima; Noboru Kotera; Teiichi Hitomi, all of Kanagawa, Japan

[73] Assignee: Dai Nippon Toryo Co., Ltd., Osaka, Japan

[22] Filed: Apr. 10, 1974

[21] Appl. No.: 459,717

[30] Foreign Application Priority Data
Apr. 26, 1973 Japan.............................. 48-47488

[52] U.S. Cl................................ 432/225; 432/253
[51] Int. Cl............................ F27b 3/02; F27b 3/18
[58] Field of Search.......... 432/225, 226, 227, 239, 432/253; 219/385, 386, 392

[56] References Cited
UNITED STATES PATENTS

| | | | |
|---|---|---|---|
| 3,109,084 | 10/1963 | Walsh................................. | 219/385 |
| 3,419,255 | 12/1968 | Carel et al......................... | 432/239 |
| 3,704,871 | 12/1972 | Paulson.............................. | 432/226 |

*Primary Examiner*—John J. Camby
*Attorney, Agent, or Firm*—Fleit & Jacobson

[57] ABSTRACT

A thermoluminescence dosimeter holder made of thermal conductive material is provided with a recess for receiving various types of thermoluminescence dosimeter without a grip and with a number of holes for receiving a rod portion of the thermoluminescence dosimeters with a grip. The thermoluminescence dosimeter holder can be pulled at least partly out of the heating box in the oven. An air space is formed between the thermoluminescence dosimeter holder and the heating box to provide a uniform temperature distribution over the thermoluminescence dosimeter holder. In a preferred embodiment, the thermoluminescence dosimeter holder is removable from the oven housing and cooled separately from the heating box.

12 Claims, 9 Drawing Figures

ANNEALING OVEN FOR THERMOLUMINESCENCE DOSIMETER

BACKGROUND OF THE INVENTION

1. Field of the Invention

This invention relates to an annealing oven for thermoluminescence dosimeters, and more particularly to an annealing oven which anneals the thermoluminescence dosimeters to permit the repeated use thereof.

2. Description of the Prior Art

It is well known in the art that certain kinds of luminescent materials emit visible or nearly-visible light rays when they are heated after being exposed to ionizing radiation such as X-rays or γ-rays. This phenomenon is called thermoluminescence. In such cases, the quantity or intensity of light of the thermoluminescence emanating from the material corresponds to the radiation dose to which the material has been exposed before the heating. Such a material can be used as a dosimeter and is called a thermoluminescence dosimeter (hereinbelow referred to simply as a "TLD").

The TLD is advantageous in that it can be made into a compact element of a convenient shape and in that it can be repeatedly used. Further, the TLD permits highly accurate measurement of the integrated dose with respect to a variety of kinds of ionizing radiation. In practice, the TLD is formed in the shape of a rod, plate, disc, rod with grip etc. Some TLDs are comprised of a thermoluminescent material sealed in the glass tube and a grip attached to the tube. All types of TLDs must be subjected to heat treatment, i.e. annealing, if they are to maintain high accuracy during repeated usage.

One of the conventional annealing ovens used for annealing TLDs has a box-like TLD holder made of metal which is directly heated by a heater. Another conventional annealing oven has a TLD holder with a number of holes for insertion of rod-with-grip type TLDs, in which each hole is provided with a heater.

The above described annealing ovens are disadvantageous in that the type of TLD which can be annealed thereby is limited to one kind in shape, the number of the TLDs which can be annealed at one time is small, the temperature distribution is biased and outer casing of the oven is likely to become hot, and accordingly, difficulty has been encountered in using the conventional ovens for annealing TLDs.

SUMMARY OF THE INVENTION

In light of foregoing observations and description of the prior art, it is an object of the present invention to provide an improved annealing oven which is able to anneal various types of TLDs at one time.

Another object of the present invention is to provide an annealing oven in which a great number of TLDs can be annealed at one time.

Still another object of the present invention is to provide an annealing oven which has uniform temperature distribution.

A further object of the present invention is to provide an annealing oven by which the annealing can be easily performed with high efficiency and safety.

A still further object of the present invention is to provide an annealing oven which does not need a cooling device attached thereto.

The annealing oven for annealing a number of various types of TLDs in accordance with the present invention comprises a heating box and a TLD holder made of thermal conductive material to be inserted into the heating box. The TLD holder is, for instance, made in the shape of a removable cassette which can be taken out of the heating box. The TLD holder has on one face thereof a recess to receive TLDs which do not have grips and on another face thereof a number of holes for insertion of TLDs in the form of a rod with a grip. The face with the holes for accommodating the TLDs with grips is made to face the front when the holder is put into the heating box so that the grips of the TLDs will not be subjected to excessive temperatures. Further, an air space is formed between the side faces of the TLD holder and the inside walls of the heating box so that the temperature can be kept uniform throughout all parts of the TLD holder. The TLD holder may be made of a metal or alloy having high thermal conductivity, or may be made of ceramic material.

PREFERRED EMBODIMENT OF THE INVENTION

Figure 1A:
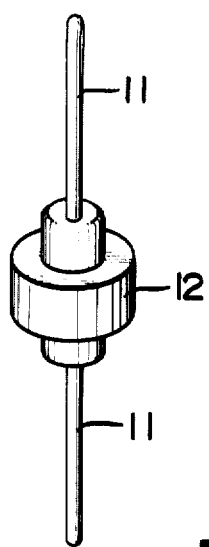
FIGS. 1(a) to 1(e) are perspective views showing examples of the thermoluminescence dosimeters to be annealed by use of the annealing oven in accordance with the present invention.

Referring to FIG. 1 which shows various types of TLDs, FIG. 1(a) is a rod-with-grip TLD comprising a pair of glass capsules 11 and 11 in which a thermoluminescent material is sealed and to which a grip 12 is fixed. FIG. 1(b) shows another type of rod-with-grip TLD in which a glass capsule 13 containing the thermoluminescent material is fixed to a grip 14. FIG. 1(c) shows a TLD in the form of a rod without a grip 16. The TLD 17 shown in FIG. 1(d) is in the form of a square plate, in which the thermoluminescent material is dispersed in a binder such as heatresisting resin. FIG. 1(e) shows a disc shaped TLD 18.

Figure 1B:
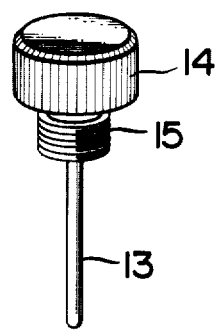
Figure 1C:
Figure 1D:
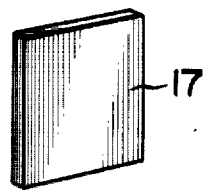
Figure 1E:
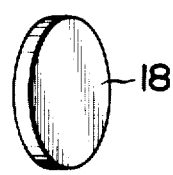
Figure 2:
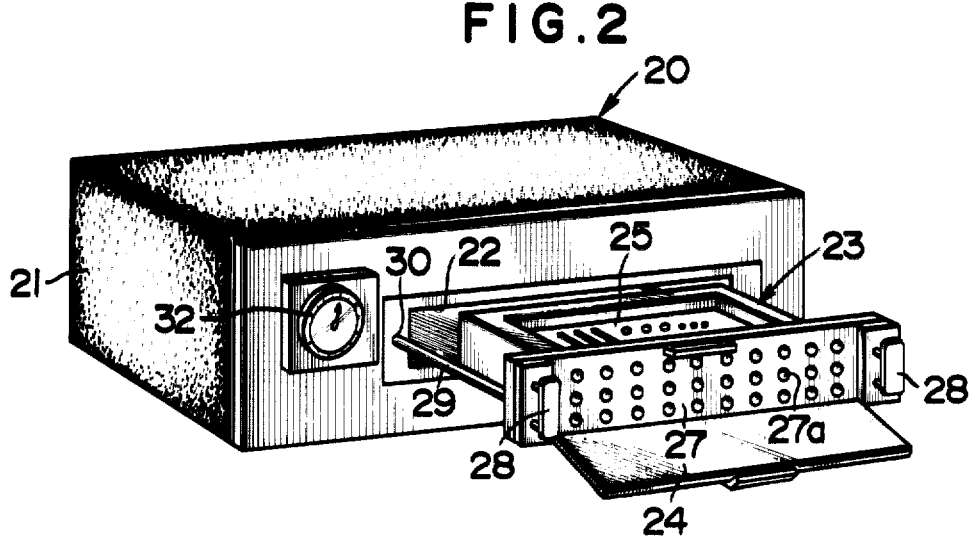
FIG. 2 is a perspective view showing the annealing oven in accordance with the present invention with the hinged cover opened and the TLD holder partly pulled out of the heating box.

Any combination of the above described various types of TLDs can be annealed at one time in accordance with the annealing oven of this invention which is described in detail hereinbelow with reference to FIGS. 2 to 5. As shown in FIG. 2, the annealing oven 20 in accordance with the present invention comprises a housing 21, a heating box 22 fixed in the housing, and a TLD holder 23 which is inserted into the heating box 22 in the housing 21. A hinged cover 24 to cover the front face of the TLD holder 23 may be provided at the opening of the heating box 22. The TLD holder 23 can be pulled partially out of the heating box 22 or can be totally removed therefrom. The top, or first, face 23a of the TLD holder 23 is provided with a recess 25 to receive various types of gripless TLDs of the types shown in FIGS. 1(c) to 1(e). The front face, or second, 23b of the TLD holder 23 is provided with a number of holes 26 for insertion of the rod or glass capsule portion 11 or 13 of TLDs in the form of a rod with grip as shown in FIGS. 1(a) and 1(b). The holes 26 provided on the front face 23b of the TLD holder 23 may be of equal or different sizes. If the holes 26 differ in size, there is an advantage in that different types of rod-with-grip TLDs can be held thereby at one time. The reference numeral 26a indicates holes having a little larger diameter than others.

Figure 3:
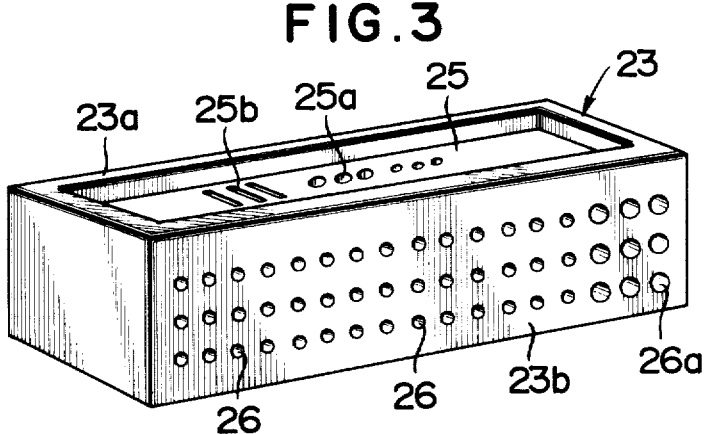
FIG. 3 is a perspective view showing the TLD holder to be inserted into the heating box of the annealing oven in accordance with the invention.
Figure 4:
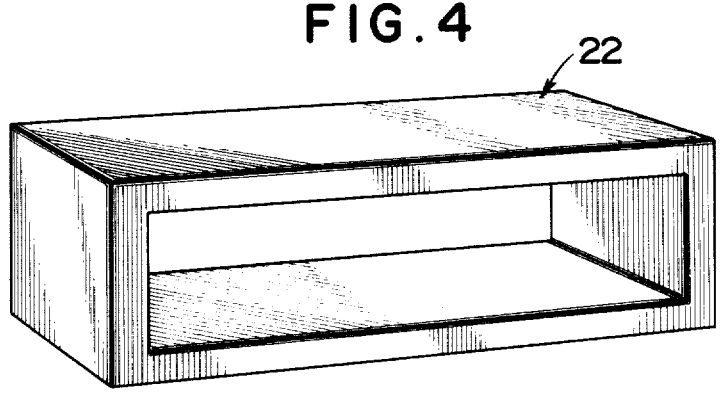
FIG. 4 is a perspective view showing the heating box employed in the annealing oven in accordance with the present invention.
Figure 5:
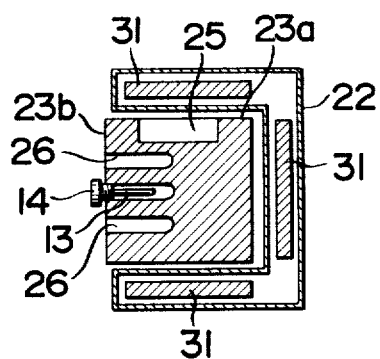
FIG. 5 is a cross sectional view of the TLD holder inserted into the heating box with the TLDs held thereby.

As shown in FIG. 2, the TLD holder 23 shaped as shown in FIG. 3 may be provided with a front panel 27 with holes 27a which are aligned with said holes 26 and 26a. The front panel 27 shown in FIG. 2 is provided with a pair of grips 28 and 28 for pulling the panel 27 together with the TLD holder 23. The front panel 27 is provided with a pair of guide pins 29 which engage with guide holes 30 and 30 provided on the front face of the housing 21 or the heating box 22. In the oven shown in FIG. 2, the guide holes 30 are provided on the front face of the heating box 22 fixed to the housing 21. By the engagement of the guide pins 29 and 29 and the guide holes 30 and 30, the TLD holder 23 is made slidable back and forth.

However, the internal dimensions of the heating box 22 are made somewhat larger than the corresponding external dimensions of the TLD holder 23, so that an air space of uniform width remains between the heating box 22 and the TLD holder 23. Because of the existence of the uniform air space between the heating box 22 and the TLD holder 23, the TLD holder 23 is uniformly heated. The TLD holder 23 is made of thermal conductive material of high thermal conductivity. Said cover 24 hinged to the opening of the heating box 22 or at least the internal coating thereof is made of heat insulating material such as asbestos. The heating box 22 is provided with a conventional heating means. In the embodiment shown in FIG. 5, three panel heaters 31 are incorporated in the walls of the heating box 22. The number of the panel heaters 31 can be selected to meet requirements. In the embodiment shown in FIG. 2, the housing 21 of the annealing oven 20 is provided with a temperature controlling means 32, which is used to set the temperature of the heating box 22 as desired. Said recess 25 formed on the top face 23a of the TLD holder 23 may be divided into several sections or may be provided with a number of variously shaped small recesses, such as those indicated by 25a and 25b, conforming to the shape of the gripless TLDs to be accommodated therein.

In operation, gripless TLDs are put into the recess 25 or small recesses 25a or 25b in the recess 25 and the TLDs having grips are inserted into the holes 26 or 26a through the holes 27a of the front panel 27, and the TLD holder 23 is inserted into the heating box 22 in the housing 21 of the oven 20. Then, the cover 24 is closed to completely enclose the TLD holder 23. Thereafter, the heating box 22 is heated by the heating means incorporated therein up to 300°C or at highest 500°C.

With the annealing oven constructed as described above in accordance with this invention, various types of the TLDs can be annealed together at one time, since the TLD holder 23 is provided both with a recess to receive TLDs without a grip and with holes to receive TLDs with a grip. Since the TLD holder 23 has a number of holes 26, it is possible to anneal a number of TLDs at one time. Further, since the TLD holder 23 employed in the annealing oven in accordance with the present invention is made of thermal conductive material and an air space is formed between the TLD holder 23 and the heating box 22, the TLDs held thereby can be uniformly heated and annealed.

It was proved experimentally that the annealing oven of the present invention reduced temperature deviation to about 5° to 8°C when annealing was performed at the temperature of 500°C, whereas the temperature deviation in a conventional annealing oven under identical conditions was about 50°C.

When the TLD holder 23 is made removable from the housing as mentioned hereinbefore, it is possible to cool the TLD holder 23 separately from the housing 21 of the oven 20. While the TLD holder 23 is cooling, another TLD holder can be put into the housing 21 thereby increasing the speed of annealing a number of TLDs.

Since the TLD holder can be removed from the housing of the oven and separately cooled, it is not necessary for the oven to be provided with a cooling device attached thereto.

We claim:

1. An annealing oven for thermoluminescence dosimeters comprising:
    a housing,
    a heating box having a hollow space, said heating box being positioned in said housing,
    a thermoluminescence dosimeter holder having a high thermal conductivity, movable between a first position in which the holder is in the hollow space of said heating box and a second position in which at least a part of the holder is out of the hollow space of the heating box,
    said thermoluminescence dosimeter holder having a plurality of faces, a first face comprising means for receiving thermoluminescence dosimeters without a grip therein and a second face having outwardly facing holes therein, said second face comprising means for accomodating a rod shaped portion of a thermoluminescence dosimeter having a grip, and
    an air space formed between said thermoluminescence dosimeter holder and said heating box when the thermoluminescence dosimeter holder is in said first position, said air space having a width sufficient to insure uniform heating of the thermoluminescence dosimeters in said holder.

2. An annealing oven for thermoluminescence dosimeters as defined in claim 1 wherein said thermoluminescence dosimeter holder is removable from the housing of the annealing oven.

3. An annealing oven for thermoluminescence dosimeters as defined in claim 1 further including means for receiving various shaped thermoluminescence dosimeters, said means being positioned on said first face.

4. An annealing oven as defined in claim 1 wherein said outwardly facing holes comprise a plurality of diameters.

5. An annealing oven as defined in claim 1 further including a grip means attached to said thermoluminescence dosimeter holder for pulling out the holder.

6. An annealing oven as defined in claim 5 wherein said grip means comprises a front panel having a plurality of holes therein, said front panel being fixed to said second face of the thermoluminescence dosimeter holder so that said front panel holes are aligned with said outwardly facing holes in the holder, and at least one grip fixed to said front panel for pulling the holder.

7. An annealing oven as defined in claim 6 wherein said front panel is provided on the back side thereof with at least one pair of guide pins to be inserted into holes provided in the front face of the housing.

8. An annealing oven as defined in claim 6 wherein said front panel is provided on the back side thereof with at least one pair of guide pins to be inserted into holes provided in the front face of the heating box in the housing.

9. An annealing oven as defined in claim 1 wherein said recess for receiving thermoluminescence dosimeters without a grip is formed on the top face of the thermoluminescence dosimeter holder and said holes for receiving the rod portion of the thermoluminescence dosimeters with a grip are provided in the front face of the thermoluminescence dosimeter holder.

10. An annealing oven for rod-shaped thermoluminescence dosimeters having grips thereon comprising a heating box having a hollow space positioned within a housing and a thermoluminescence dosimeter holder having a high thermal conductivity and adapted to fit within said hollow space, with at least one side not confined by said space, said one side having a series of outwardly facing holes therein to receive a rod shaped thermoluminescence dosimeter while at the same time allowing the grip to remain outside said holder and said heating box, the spacial relation between the holder and the hollow space when said holder is in position such that an air space of sufficient dimension is formed to insure uniform heating of the thermoluminescence dosimeters in said holder.

11. In combination, an annealing oven and thermoluminescence dosimeters of varying shapes, said annealing oven comprising a heating box having a hollow space and positioned within a housing and a thermally conductive holder adapted to be fitted within said hollow space for supporting said thermoluminescence dosimeters, said thermoluminescence dosimeter holder having a plurality of faces, a first face comprising means for receiving thermoluminescence dosimeters without a grip therein and a second face comprising means for accomodating a rod shaped portion of a thermoluminescence dosimeter having a grip.

12. An annealing oven as defined in claim 1 wherein the heating range of said oven is between 300° and 500°C.

* * * * *